United States Patent
Mian et al.

(10) Patent No.: US 7,525,667 B2
(45) Date of Patent: Apr. 28, 2009

(54) PORTABLE ELECTRONIC MEASUREMENT

(75) Inventors: Zahid F. Mian, Loudonville, NY (US); Robert MacAllister, Mechanicville, NY (US); William Peabody, Saratoga Springs, NY (US)

(73) Assignee: International Electronic Machines Corp., Troy, NY (US)

( * ) Notice: Subject to any disclaimer, the term of this patent is extended or adjusted under 35 U.S.C. 154(b) by 293 days.

(21) Appl. No.: 11/134,944

(22) Filed: May 23, 2005

(65) Prior Publication Data

US 2005/0259273 A1 Nov. 24, 2005

Related U.S. Application Data

(60) Provisional application No. 60/573,332, filed on May 24, 2004.

(51) Int. Cl.
*G01B 11/24* (2006.01)

(52) U.S. Cl. .................. 356/601; 356/603; 356/612

(58) Field of Classification Search ......... 356/399–401, 356/601
See application file for complete search history.

(56) References Cited

U.S. PATENT DOCUMENTS

| | | | |
|---|---|---|---|
| 751,347 A * | 2/1904 | Scheimpflug | 355/77 |
| 1,654,070 A * | 12/1927 | Corlett et al. | 353/5 |
| 3,820,016 A | 6/1974 | Gieskieng | |
| 4,181,430 A * | 1/1980 | Shirota et al. | 356/3.06 |
| 4,407,072 A | 10/1983 | Hoskins, Jr. | |
| 4,798,963 A * | 1/1989 | Wittkopp et al. | 250/559.22 |
| 4,798,964 A | 1/1989 | Schmalfuss et al. | |
| 4,904,939 A * | 2/1990 | Mian | 324/229 |
| 4,932,784 A | 6/1990 | Danneskiold-Samsoe | |
| 5,128,880 A * | 7/1992 | White | 382/165 |
| 5,193,120 A | 3/1993 | Gamache et al. | |
| 5,247,338 A | 9/1993 | Danneskiold-Samsoe et al. | |
| 5,636,026 A * | 6/1997 | Mian et al. | 356/602 |
| 5,767,973 A * | 6/1998 | Naumann | 356/602 |
| 5,793,492 A * | 8/1998 | Vanaki | 356/613 |
| 5,808,906 A | 9/1998 | Sanchez-Revuelta et al. | |
| 5,936,737 A * | 8/1999 | Naumann | 356/613 |
| 6,040,903 A * | 3/2000 | Lysen et al. | 356/153 |
| 6,199,190 B1 * | 3/2001 | Wan | 714/786 |
| 6,509,973 B2 * | 1/2003 | Kiyoi et al. | 356/606 |
| 6,542,249 B1 * | 4/2003 | Kofman et al. | 356/601 |
| 6,701,230 B2 * | 3/2004 | Bergerhoff et al. | 701/29 |
| 6,768,551 B2 | 7/2004 | Mian et al. | |
| 6,868,319 B2 * | 3/2005 | Kipersztok et al. | 701/29 |
| 6,909,514 B2 * | 6/2005 | Nayebi | 356/601 |

FOREIGN PATENT DOCUMENTS

| | | |
|---|---|---|
| EP | 0 007 227 A1 | 1/1980 |
| GB | 2 183 840 A | 6/1987 |

* cited by examiner

*Primary Examiner*—L. G Lauchman
*Assistant Examiner*—Jarreas C Underwood
(74) *Attorney, Agent, or Firm*—Hoffman Warnick LLC

(57) ABSTRACT

The invention provides a handheld electronic gauge that is configured to obtain measurement data for an object, such as a wheel, rail, axle, or the like. The gauge includes one or more position sensors that automatically determine when the gauge is in a measurement position. The invention also provides a handheld computing device that can automatically determine when a gauge is in the measurement position and automatically obtain measurement data using the gauge. As a result, the invention provides a solution for measuring an object, such as a railway wheel, that is portable and capable of repeatedly providing various desired measurements, irrespective of the operator.

23 Claims, 12 Drawing Sheets

PORTABLE ELECTRONIC MEASUREMENT

REFERENCE TO PRIOR APPLICATION

The current application claims the benefit of co-pending U.S. Provisional Application No. 60/573,332, filed on May 24, 2004, which is hereby incorporated herein by reference.

BACKGROUND OF THE INVENTION

1. Technical Field

The invention relates generally to wheel measurement, and more particularly, to an electronic gauge for obtaining reliable measurements of an object, such as transportation objects (e.g., railway wheel, rail, axle, vehicle wheel, etc.).

2. Background Art

During use, a wheel's profile wears due to friction and the like. Additionally, a wheel may become damaged due to poor conditions and/or one or more foreign objects. The wear and/or damage can render the wheel unsafe for operation. Similar problems can occur with rails, axles, and other transportation objects being used over time. As a result, it is important to periodically inspect each transportation object that is in use and/or slated for use.

For example, the profile of a railway wheel and/or rail are periodically inspected. To this extent, important attributes of the wheel profile include a rim thickness, a flange thickness, and a flange height. During normal wear due to contact between the railway wheel and rail, the rim thickness and flange thickness will decrease and the flange height will increase. An accurate determination of each of these attributes is important to ensure that sufficient metal remains on the railway wheel for safe operation. Such a measurement is typically performed in a train yard or a train shop. Similarly, when truing (e.g., re-cutting) a railway wheel to restore a desired wheel profile in a train shop, these attributes, as well as the wheel diameter, are determined to ensure that the railway wheel is safe for operation. Additionally, a wheel manufacturer may measure one or more attributes of the railway wheel profile to perform quality control or the like on a newly manufactured railway wheel.

Historically, the measurement of one or more attributes of a railway wheel and/or rail profile has been taken using a mechanical caliper. To this extent, an operator obtains the measurement directly from the mechanical caliper while it is placed on the railway wheel/rail and manually records the measurement for later reference. However, this solution has several drawbacks. For example, when the railway wheel is installed, other mechanical parts, such as a braking system, a shock absorber, axle support, etc., limit the space in which to obtain the measurement. Additionally, other factors, such as poor lighting, manual recording errors, keypunch errors, etc., can introduce errors in the measurement process. Measurement errors can lead to an unacceptable/unsafe railway wheel remaining in operation, the premature condemnation of a railway wheel when it could have been trued, the inclusion of a railway wheel for truing when it should have been condemned, and the like. As a result, each year, accidents occur due to the use of excessively worn railway wheels and money is lost due to the inaccurate truing/condemnation classification of railway wheels. Further, the mechanical caliper does not yield measurements that can be automatically provided to a computerized wheel management system frequently used to manage the wheel maintenance process.

To address this situation, several proposals have been made for performing electronic railway wheel/rail measurement. However, each of these proposals includes one or more limitations. For example, some proposals only measure a subset of the required attributes, such as a rim profile. Additionally, some proposals are not portable, require additional computing capability and/or cannot provide data to a remote system.

To this extent, a need exists for a portable electronic measurement solution that helps ensure the accurate measurement of all attributes of an object, such as a railway wheel, rail, axle, or the like, that may be desired for a particular application and/or communicate the measured attributes to a remote system for further processing without requiring data entry by an operator.

SUMMARY OF THE INVENTION

The invention provides a handheld electronic gauge that is configured to obtain measurement data for an object, such as a wheel, rail, axle, or the like. The gauge includes one or more position sensors that automatically determine when the gauge is in a measurement position. The invention also provides a handheld computing device that can automatically determine when a gauge is in the measurement position and automatically obtain measurement data using the gauge. As a result, the invention provides a solution for measuring an object, such as a railway wheel, that is portable and capable of repeatedly providing various desired measurements, irrespective of the operator.

A first aspect of an embodiment of the invention provides a method of measuring an object, the method comprising: positioning a handheld electronic gauge adjacent to the object; automatically determining that the gauge is in a measurement position; and obtaining measurement data for the object using the gauge, wherein the obtaining step includes: illuminating the object; and sensing a reflection of the illuminated object.

A second aspect of the invention provides a system for measuring an object, the system comprising a handheld electronic gauge that includes: means for automatically determining that the gauge is in a measurement position with respect to the object; and means for obtaining measurement data for the object, wherein the means for obtaining includes: means for illuminating the object; and means for sensing a reflection of the illuminated object for each of a plurality of points on the object.

A third aspect of the invention provides a system for measuring an object, the system comprising a handheld computing device that includes: means for automatically determining that a gauge is in a measurement position with respect to the object; and means for automatically obtaining measurement data for the object when the gauge is in the measurement position, wherein the means for automatically obtaining includes: means for operating means for illuminating the object; and means for operating means for sensing a reflection of the illuminated object.

A fourth aspect of the invention provides a computer-readable medium that includes computer program code to enable a computer infrastructure to measure an object, the computer-readable medium comprising computer program code for automatically determining that a gauge is in a measurement position with respect to the object; and automatically obtaining measurement data for the object when the gauge is in the measurement position, wherein the automatically obtaining includes: operating means for illuminating the object; and operating means for sensing a reflection of the illuminated object.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a handheld electronic gauge that is configured to obtain measurement data for an object, such as a wheel, rail, axle, or the like. The gauge includes one or more position sensors that automatically determine when the gauge is in a measurement position. The invention also provides a handheld computing device that can automatically determine when a gauge is in the measurement position and automatically obtain measurement data using the gauge. As a result, the invention provides a solution for measuring an object, such as a railway wheel, that is portable and capable of repeatedly providing various desired measurements, irrespective of the operator.

Figure 1:
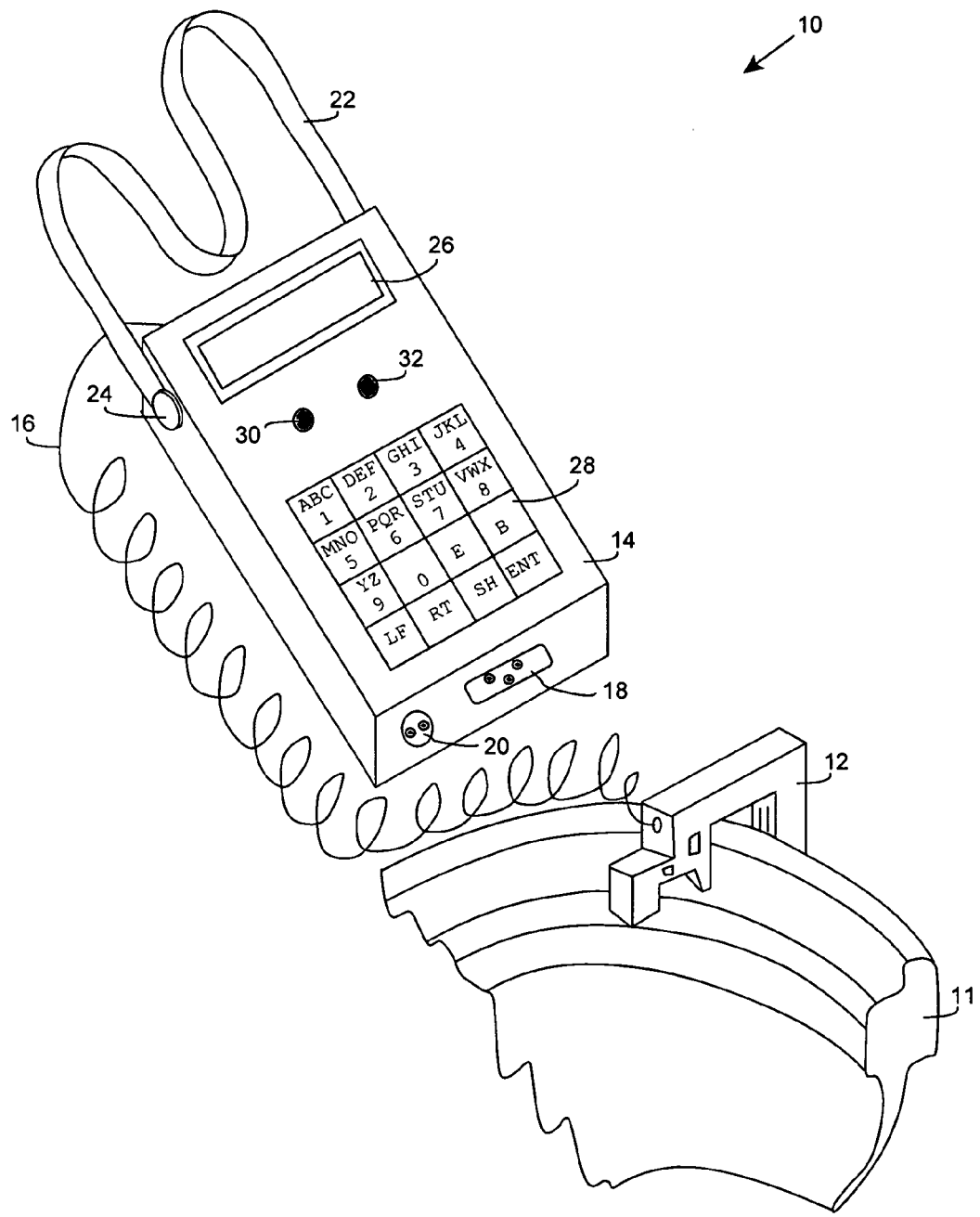
FIG. 1 shows an illustrative environment for measuring a wheel.

Various aspects of the invention are discussed in detail with reference to an illustrative application in which the invention measures various attributes of a wheel, and particularly, a railway wheel. However, it is understood that the railway wheel is only an illustrative object. As described further herein, the invention can be used to measure attributes of many types of objects. Turning to the drawings, FIG. 1 shows an illustrative environment 10 for measuring a wheel 11. To this extent, environment 10 includes a handheld electronic gauge 12 and a handheld computing device 14. In general, gauge 12 includes one or more systems for obtaining measurement data for wheel 11, and computing device 14 provides data acquisition, data processing and data storage for the measurement data. Further, computing device 14 provides a user interface for interacting with a user and/or an interface for communicating with one or more additional computing devices.

As shown, gauge 12 and computing device 14 can communicate via wiring cable 16. To this extent, computing device 14 and gauge 12 can each include a connector for permanently or detachably connecting wiring cable 16. The use of wiring cable 16 provides a one-to-one communications link, thereby enabling the use of a simplified solution for communications between gauge 12 and computing device 14. However, it is understood that gauge 12 and computing device 14 can communicate using any type of wired and/or wireless solution for communicating. To this extent, computing device 14 can include a communications port 18 that enables wireless and/or wired communications between computing device 14 and gauge 12 and/or another computing device (not shown).

In addition to enabling communications, wiring cable 16 can provide gauge 12 with power that is supplied by computing device 14. As mentioned above, computing device 14 and gauge 12 are portable. To this extent, computing device 14 and/or gauge 12 can comprise a portable power source such as a battery or the like. Further, computing device 14 is shown including a receptacle 20 that can be used to recharge a battery and/or connect computing device 14 to an external source of power (e.g., wall socket). In any event, it is understood that the locations of communications port 18, receptacle 20 and/or a connector for wiring cable 16 are only illustrative, and these interfaces can be located anywhere on computing device 14 and/or gauge 12.

Still further, computing device 14 is shown including a neck strap 22 that can be temporarily attached to computing device 14 using, for example, a pair of screws 24. It is understood that neck strap 22 is only illustrative of various solutions for assisting a user in carrying/accessing computing device 14. Alternatively, computing device 14 could be used as a table/machine top unit, in which case neck strap 22 or the like would not be necessary.

Computing device 14 provides an interface for a user. To this extent, computing device 14 is shown including a keypad 28 and a display 26 for enabling the user to operate computing device 14 and/or gauge 12. In particular, the user can enter data using keypad 28 and view data displayed using display 26. In one embodiment, keypad 28 comprises a full alphanumeric keyboard and display 26 comprises a liquid crystal display and is placed under a display bezel. It is understood that keypad 28 and display 26 are only illustrative of various input/output devices. To this extent, computing device 14 is further shown including a speaker 30 and a microphone 32 for enabling voice-controlled operation, audible notification, and/or the like.

Further details of environment 10 are shown and discussed with reference to FIG. 2, which shows a block diagram of environment 10. In general, environment 10 comprises a computer infrastructure 13 that can perform the various process steps described herein for measuring a wheel 11 (FIG. 1). In particular, computer infrastructure 13 is shown including handheld electronic gauge 12 and handheld computing device 14 as discussed above. Computing device 14 comprises an operator system 50, which enables computing device 14 and gauge 12 to measure wheel 11 by performing the process steps of the invention.

Additionally, computer infrastructure 13 is shown including an analysis device 15 that provides additional functionality for analyzing wheel 11 (FIG. 1) as described herein. To this extent, computing device 14 can provide measurement data for wheel 11 over a communications link 19 for processing on analysis device 15. Communications link 19 can comprise any combination of various types of communications links as is known in the art. For example, communications link 19 can comprise one or more of any type of wired and/or wireless communications link, such as a public/private network, or the like. When communications link 19 comprises a network, the network can comprise any combination of one or more types of networks (e.g., the Internet, a wide area network, a local area network, a virtual private network, etc.). Regardless, communications between computing device 14 and analysis device 15 may utilize any combination of various types of transmission techniques.

In general, computing device 14 and/or analysis device 15 can comprise any general purpose computing article of manufacture capable of executing computer program code installed by a user 17 (e.g., a personal computer, server, handheld device, etc.). To this extent, computing device 14 and analysis device 15 can each comprise hardware elements that provide the same functionality. Using computing device 14 as an example, computing device 14 and/or analysis device 15 can include a processor 40, a memory 42A, an input/output (I/O) interface 44, a bus 46, and an I/O device/resource 48, and be in communication with an external storage system 42B (shown in communication with analysis device 15). As is known in the art, in general, processor 40 executes computer program code, such as operator system 50, that is stored in memory 42A and/or storage system 42B. While executing the computer program code, processor 40 can read and/or write data, such as wheel data 72, to/from memory 42A, storage system 42B, and/or I/O interface 44. Bus 46 provides a communications link between each of the components. I/O device 48 can comprise any device that enables user 17 to interact with computing device 14 or any device that enables computing device 14 to communicate with one or more other computing devices, such as analysis device 15.

It is understood that computing device 14 and operator system 50 are only representative of various possible equivalent computing devices that may perform the various process steps of the invention. To this extent, in other embodiments, computing device 14 and/or analysis device 15 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Additionally, computing device 14 comprises one or more I/O devices for interfacing with handheld electronic gauge 12. In general, gauge 12 can comprise a housing for holding and positioning one or more electronic devices that are used in receiving data on wheel 11 (FIG. 1) and providing the data for processing on computing device 14. To this extent, as discussed further below, gauge 12 can comprise a particular shape and/or configuration based on the type of wheel 11 to be measured.

Operator system 50 enables computing infrastructure 13 to measure wheel 11 (FIG. 1) using gauge 12. To this extent, operator system 50 is shown including an identification system 52 for obtaining identification information for wheel 11, a capture system 54 for obtaining measurements for one or more points on wheel 11 using gauge 12, an attribute system 56 for determining one or more attributes of wheel 11, and a display system 58 for displaying the measurement(s)/attribute(s) to user 17. In operation, operator system 50 interacts with one or more devices located on gauge 12. For example, gauge 12 can comprise a positioning system 60 that comprises one or more sensing devices for correctly positioning gauge 12 next to wheel 11, a measurement system 62 that can comprise an illumination system 64 for illuminating wheel 11 and/or a sensing system 64 for obtaining one or more data points on wheel 11, and an interface system 68 that enables gauge 12 to interface with computing device 14 and/or user 17. Additionally, operator system 50 can communicate with a comparison system 70 for comparing one or more measurements for wheel 11 with previous measurements, a desired measurement and/or a standard. Operation of each of these systems is discussed further below. However, it is understood that some of the systems and/or functionality may be combined, may not be implemented, additional systems and/or functionality may be included as part of environment 10, and/or the various systems may be implemented on a different device within environment 10.

Figure 3:
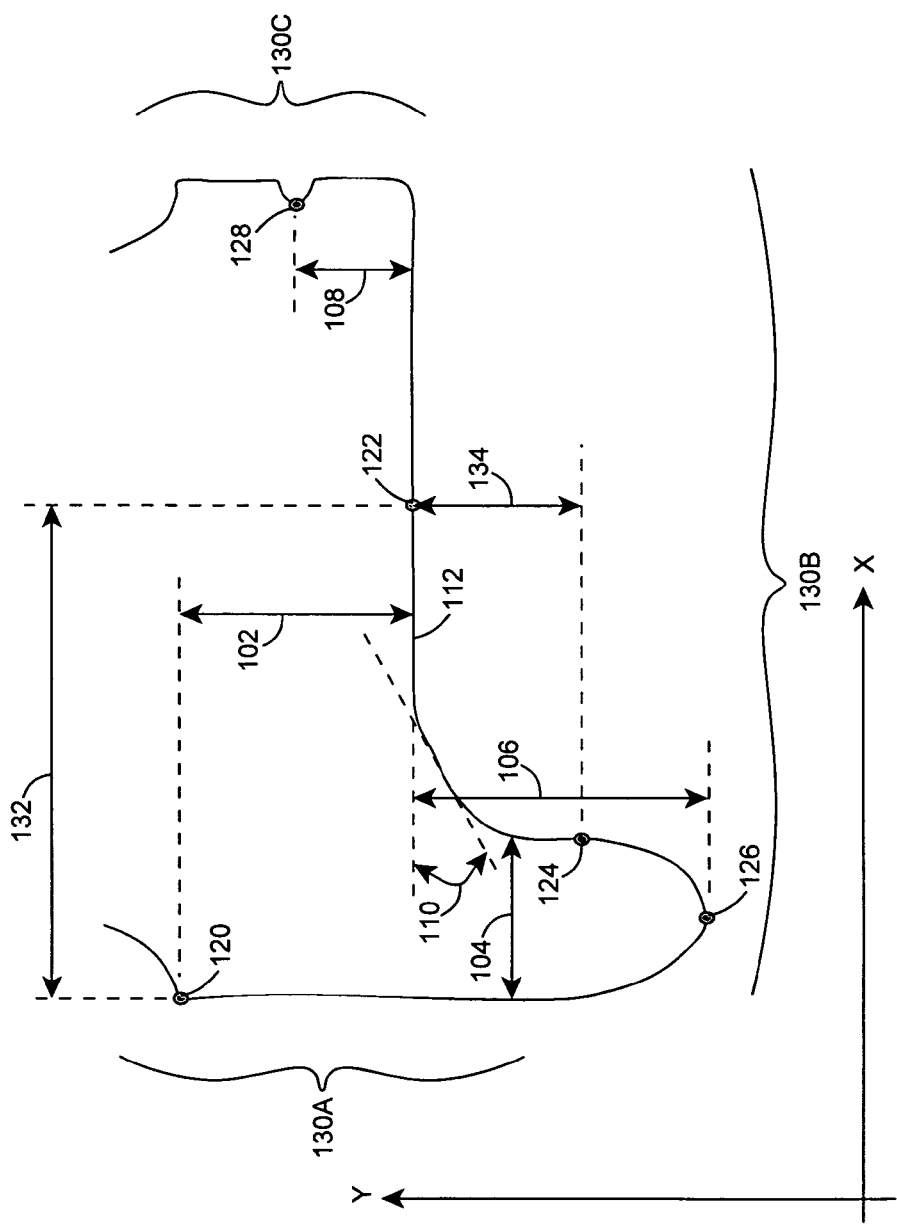
FIG. 3 shows an illustrative set of measurements that may be desired for a railway wheel.

In one embodiment, gauge 12 and computing device 14 are used to measure a railway wheel 11 (FIG. 1). To this extent, FIG. 3 shows an illustrative set of measurements that may be desired for a railway wheel 11. In particular, a profile 112 of a portion of wheel 11 can be determined. Profile 112 can be used to obtain the set of measurements. The measurements include a rim thickness 102, which comprises a vertical distance between a rim thickness point 120 and a tread surface point 122; a flange thickness 104, which comprises a horizontal distance between rim thickness point 120 and a flange thickness point 124; a flange height 106, which comprises a vertical distance between a flange height point 126 and tread surface point 122; and a reference groove measurement 108, which comprises a vertical distance between a reference groove point 128 and tread surface point 122. Additional measurements, such as a flange angle 110, a profile 112 of wheel 11, and/or a diameter of wheel 11 may also be included in the set of measurements as discussed further herein.

Figure 4:
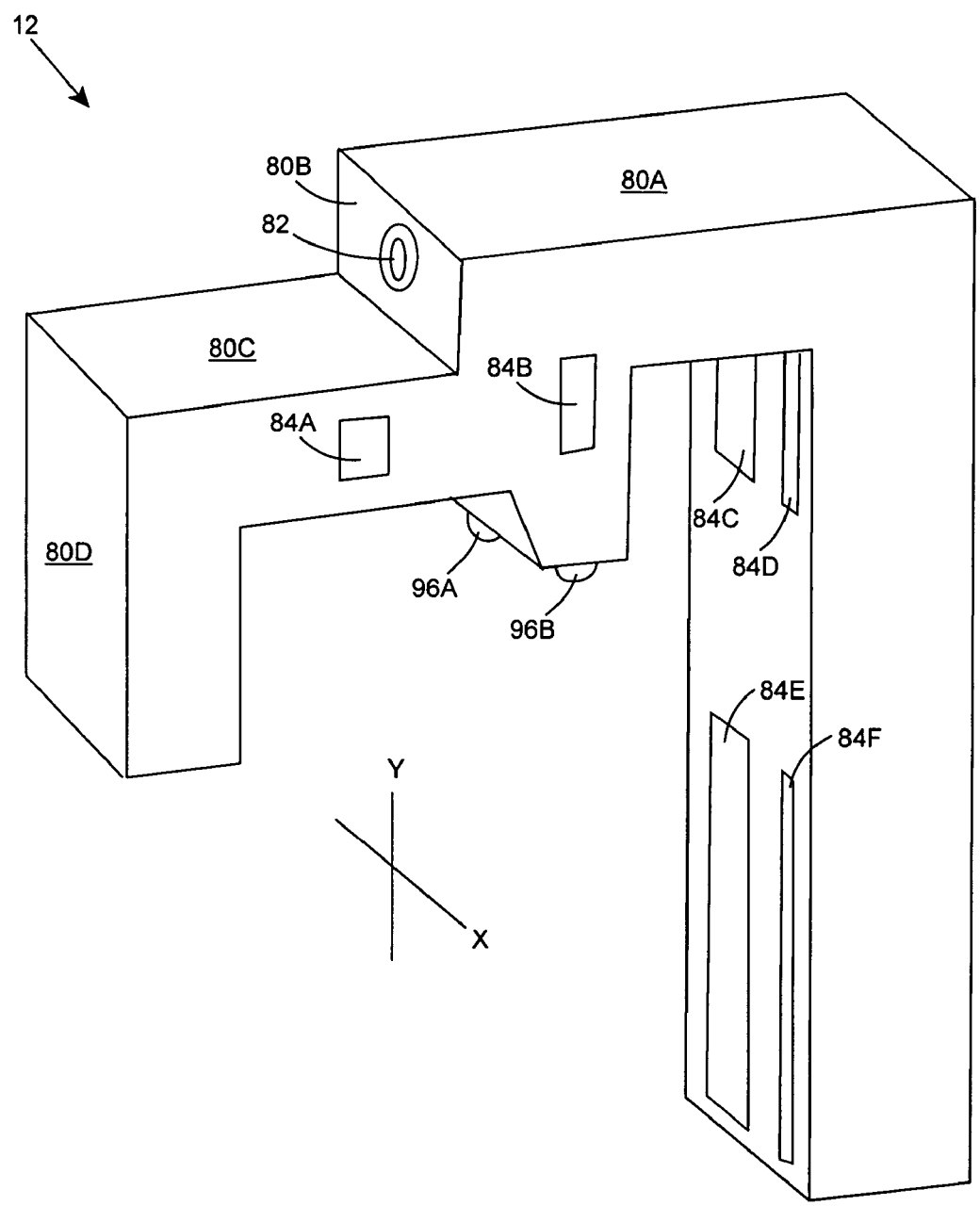
FIG. 4 shows a more detailed view of an illustrative gauge that is configured to obtain the set of measurements for a railway wheel.

Gauge 12 (FIG. 1) can be configured to obtain a plurality of data points that can be used to determine profile 112 and/or the desired set of measurements. To this extent, FIG. 4 shows a more detailed view of an illustrative gauge 12 that is configured to obtain the set of measurements for railway wheel 11 (FIG. 1). In general, gauge 12 is configured to fit over a flange of wheel 11. As such, gauge 12 comprises an inverted "J" shape and can comprise a housing made of, for example, aluminum, which can include one or more removable covers 80A-D for providing access to the components disposed therein. A connector 82 is shown located on cover 80B and provides a removable connection interface for wiring cable 16 (FIG. 1). In one embodiment, connector 82 comprises a female connector surrounded by a rubber washer or the like to assist in holding wiring cable 16 (FIG. 1) in place.

As noted previously, gauge 12 includes various components disposed therein for measuring railway wheel 11 (FIG. 1). In one embodiment, one or more points on wheel 11 are optically sensed by the various components in gauge 12. To this extent, the housing of gauge 12 is shown including a plurality of windows 84A-F that allow light to pass there through. Each window 84A-F could comprise an empty opening and/or comprise a transparent material. In the latter case, the transparent material can be configured to only allow a particular spectrum of light to pass there through, thus providing improved sensing of the points. Further, each window 84A-F could comprise a shutter or the like to provide protection from the elements when gauge 12 is not in use.

Figure 5:
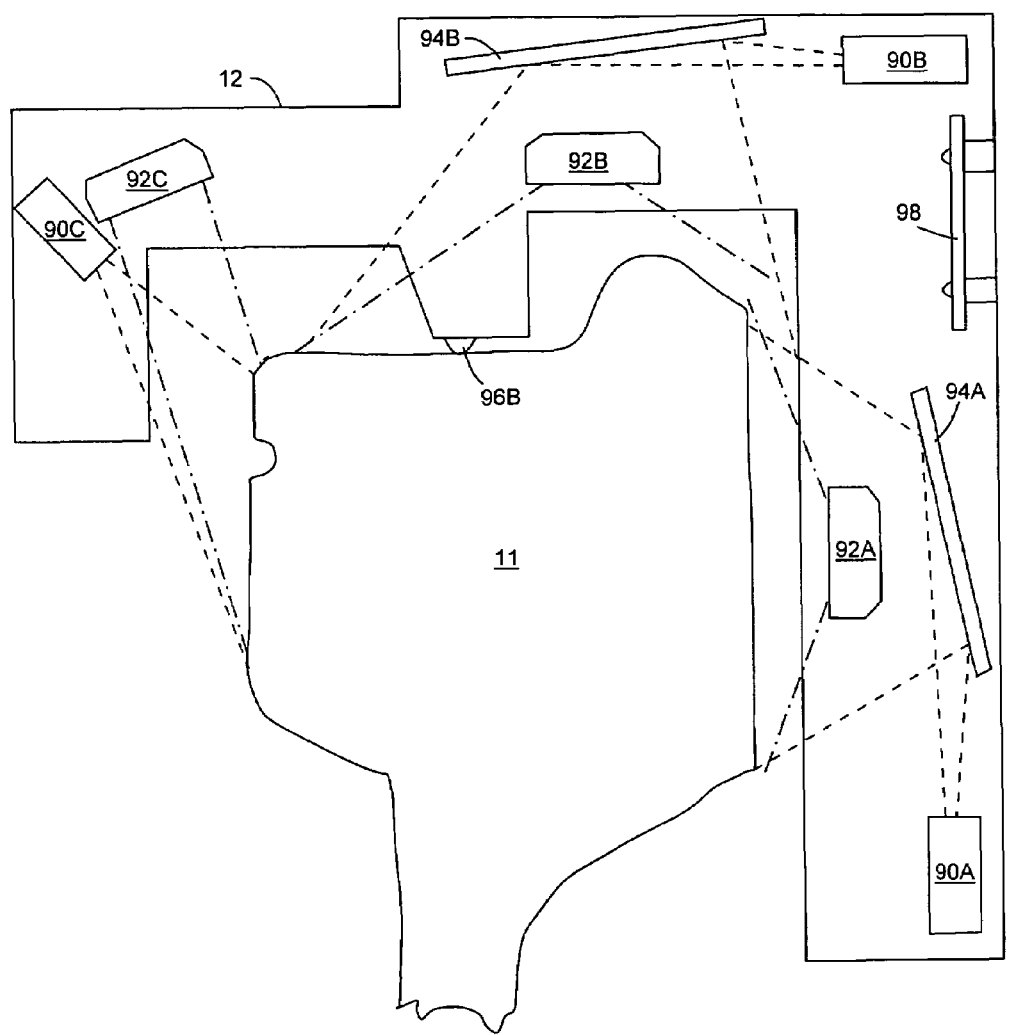
FIG. 5 shows an illustrative configuration of components for the gauge in FIG. 4.
Figure 7:
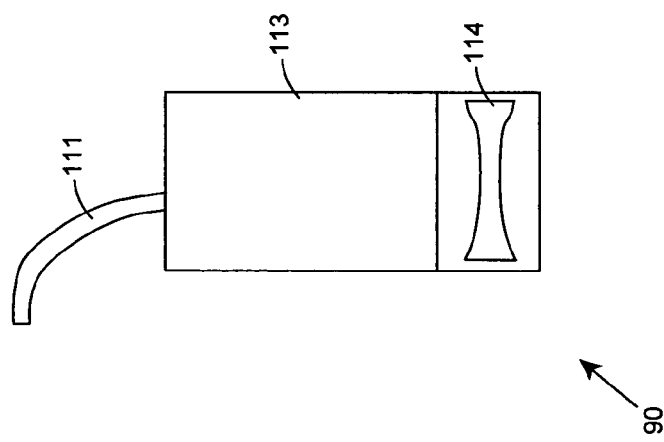
FIG. 7 shows an illustrative laser line generator.

An illustrative configuration of components for gauge 12 is shown in FIG. 5. In particular, gauge 12 is shown including a plurality of pairs of light generating devices 90A-C and light sensing devices 92A-C. In operation, each light generating device 90A-C can generate light that is directed onto wheel 11. To this extent, a mirror 94A-B can be incorporated to reflect the light generated by a corresponding light generating device 90A-B toward wheel 11. In one embodiment, each light generating device 90A-C comprises a laser line generator, which generates a laser line that is directed onto wheel 11. FIG. 7 shows an illustrative laser line generator 90. In this case, laser line generator 90 includes a power cord 111, a laser generator body 113, and a double concave lens 114. However, it is understood that laser line generator 90 is only illustrative of any possible light generating device. For example, laser line generator 90 could generate a plurality of laser lines which can provide for additional measurements for higher accuracy and redundancy.

Figure 8:
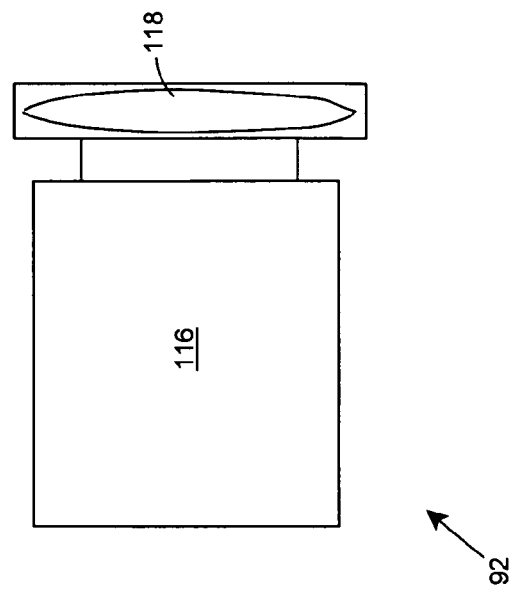
FIG. 8 shows an illustrative light sensing device.

Returning to FIG. 5, light generated by each light generating device 90A-C is reflected off of wheel 11 and is sensed by a corresponding light sensing device 92A-C. FIG. 8 shows an illustrative light sensing device 92. In this case, light sensing device 92 includes an image sensor body 116 and a double convex lens 118. In operation, double convex lens 118 directs light, such as the reflection of the laser line described above, into image sensor body 116 for sensing. However, it is understood that light sensing device 92 is only illustrative of any possible light sensing device. For example, other types of optics could be used to achieve the objects of the present invention.

Referring to both FIGS. 3 and 5, each light generating device 90A-C and light sensing device 92A-C pair is configured within gauge 12 to obtain a set (one or more) of data points within a subset 130A-C of profile 112 of wheel 11. To this extent, light generating device 90A and light sensing device 92A can obtain a set of data points for subset 130A, light generating device 90B and light sensing device 92B can obtain a set of data points for subset 130B, and light generating device 90C and light sensing device 92C can obtain a set of data points for subset 130C.

In one embodiment, each set of data points comprises hundreds and/or thousands of data points. In this case, the invention provides a highly detailed and accurate measurement of the profile 112 of wheel 11. Alternatively, only a small number of data points, e.g., less than one hundred, could be obtained for one or more subsets 130A-C. In this case, the invention can provide sets of data points that require less storage space, and can be used to generate a quicker response of measurements in the areas of key wheel dimensions over prior art solutions that image and process the entire wheel 11. Regardless, it is understood that the number of data points for each subset 130A-C could be scaled within a broad range from a few data points to tens of thousands of data points depending on the requirements of the user.

In any event, all the desired measurements described above can be calculated using the approximated wheel profile 112 and/or data points. To this extent, subset 130A includes data points that can be used to measure rim thickness 102, subset 130B includes data points that can be used to measure flange thickness 104 and/or flange height 106, and subset 130C includes data points that can be used to obtain reference groove measurement 108. Additionally, the data points for each subset 130A-C can be combined to approximate cross-sectional wheel profile 112 from which the measurements can be obtained. In this case, profile 112 can be used to calculate flange angle 110. The various data points can be processed using any known solution. For example, a commercially available measurement extraction program, such as WHEEL-PROF by International Electronic Machines (IEM) Corp. of Albany, N.Y., can be used to calculate one or more of the desired measurements.

To obtain the desired measurements, profile 112 can be treated as a two-dimensional plot of x-y points, in which the coordinates are scaled to a particular measurement system (e.g., English units such as inches, metric units such as centimeters, or the like) in a known manner. By traversing profile 112, a point that comprises a smallest y-coordinate can be identified as flange height point 126. Further, rim thickness point 120 can be identified based on a slope change in profile 112, and reference groove point 128 can be identified based on a slope change in profile 112 and a corresponding point having a lowest x-coordinate. Still further, tread surface point 122 can be identified based on a distance from the x-coordinate for rim thickness point 120 that corresponds to a taping line distance 132 as defined by the Association of American Railroads (AAR)'s Manual of Standards, Section G ("Standards"). Additionally, flange thickness point 124 (gaging point in the Standards) can be located by identifying a point on the flange of profile 112 for which the y-coordinate is a gaging point distance 134, as defined by the Standards, from the y-coordinate of tread surface point 122. Using each of the identified points, the desired measurements can be obtained as described above.

In order to obtain accurate measurements, it is important that gauge 12 be properly aligned with wheel 11. To this extent, referring to FIGS. 4 and 5, gauge 12 is shown including a pair of positioning sensors 96A-B. Positioning sensors 96A-B are shown located such that when gauge 12 is properly aligned with wheel 11 in a horizontal direction, positioning sensors 96A-B contact the flat tread surface of wheel 11 along the gauging line defined in the Standards. It is understood that alternative locations for and/or additional positioning sensors 96A-B could be incorporated in gauge 12 as will be recognized by one in the art. For example, in addition to positioning sensors 96A-B, four additional sensors could be located above light sensing device 92A in a rectangular configuration to provide further assurance of the proper alignment of gauge 12 with wheel 11. In any event, positioning sensors 96A-B can comprise any type of location sensing device. For example, positioning sensors 96A-B can each comprise an opto-interrupter that is operated by a corresponding mechanical plunger, a capacitive sensor, or the like.

Figure 6:
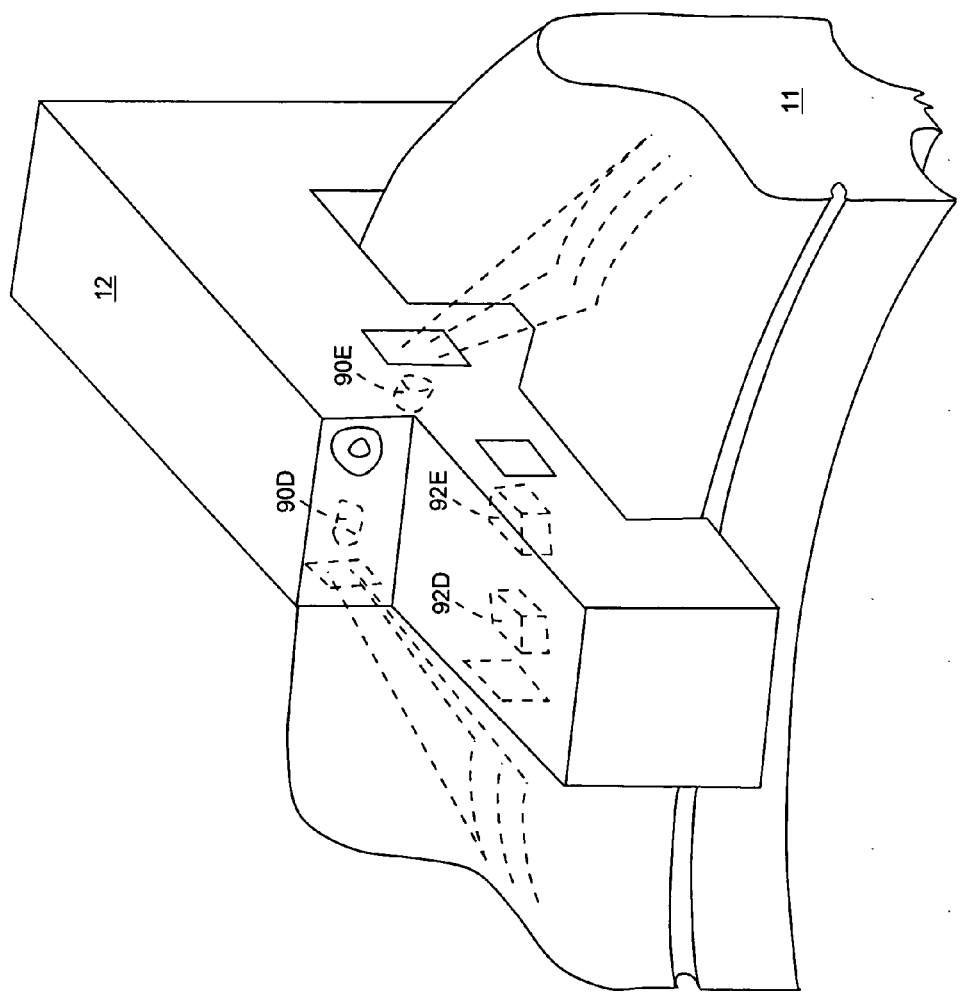
FIG. 6 shows a perspective view of the gauge in FIG. 4 obtaining a set of data points for determining the diameter of a wheel.

Gauge 12 can be configured to obtain various other measurements of wheel 11. For example, gauge 12 can be configured to obtain data for determining a diameter of wheel 11. To this extent, FIG. 6 shows a perspective view of gauge 12 obtaining a set of data points for determining the diameter of wheel 11. In particular, gauge 12 is shown including a pair of light generating devices 90D-E and a corresponding pair of light sensing devices 92D-E that are each configured to obtain a set of data points on opposing sides of gauge 12. In particular, light generating devices 90D-E can generate a plurality of laser lines, or the like, that are directed at a wheel tread surface of wheel 11. Light sensing devices 92D-E can then sense the reflected light from the wheel tread surface as is known in the art. Subsequently, the data can be used to obtain an approximate diameter of wheel 11 in a known manner.

Returning to FIG. 5, gauge 12 can further include a circuit board 98. Circuit board 98 can comprise various components (e.g., electronics, program code, etc.) for interfacing with and/or controlling the operation of each of positioning sensors 96A-B, light generating devices 90A-E, and/or light sensing devices 92A-E. Further, circuit board 98 can provide an interface for communications between the various components of gauge 12 and handheld computing device 14 (FIG. 1). To this extent, circuit board 98 can electronically activate light generating devices 90A-E and light sensing devices 92A-E based on a signal received from computing device 14, and can receive output signals from light sensing devices 92A-E and positioning sensors 96A-B. Circuit board 98 can store the received output signals and/or forward the data to computing device 14 for further processing.

Figure 9:
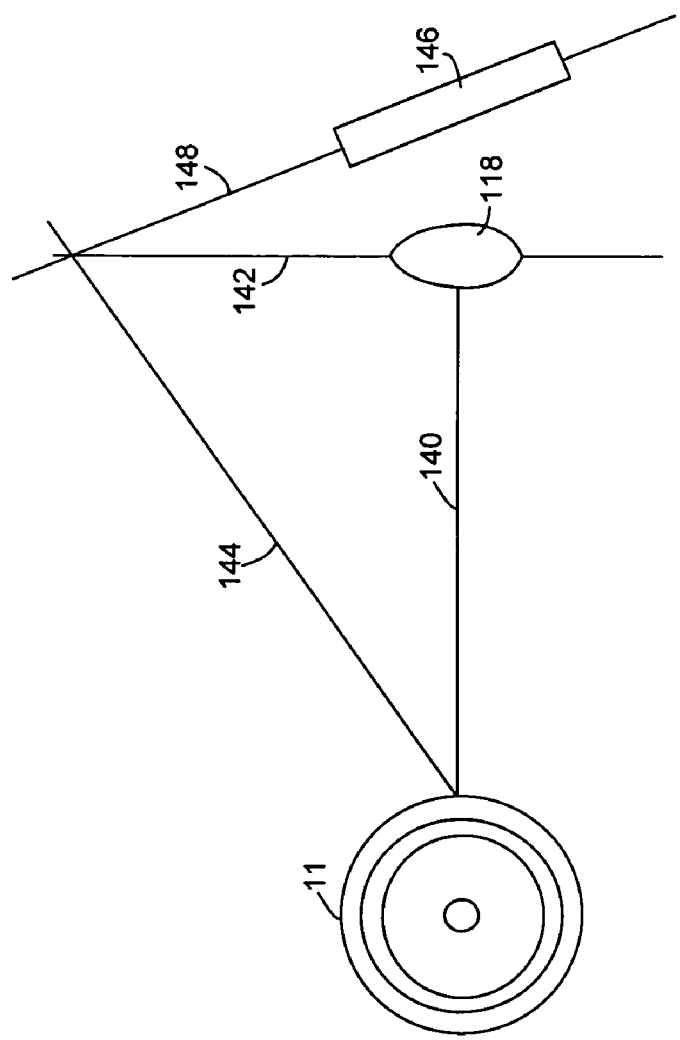
FIG. 9 shows an illustrative geometry that can be implemented to achieve a sharp focus in a limited optical space.

When properly positioned, portions of gauge 12 are in close proximity to wheel 11. To this extent, FIG. 9 shows an illustrative geometry that can be implemented by the various components of gauge 12 to achieve a sharp focus in a limited optical space. In particular, the various components are configured to satisfy the Scheimpflug condition. To this extent, double convex lens 118 (e.g., within light sensing device 92 of FIG. 8) is oriented to view wheel 11 along a viewing axis 140 and lies on a plane 142 that is normal to both viewing axis 140 and to the plane of FIG. 9. Viewing axis 140 intersects with a projection axis 144 at a point on wheel 11. Further, a surface of an image sensor array 146 is configured to lie along a line 148 that intersects projection axis 144 at the same location where projection axis 144 and plane 142 intersect. While image sensor array 146 can occupy different angular orientations, increased accuracy is obtained using the geometry of FIG. 9. However, it is understood that various modifications, substitutions, and the like, can be made to the geometry and orientation described herein while still satisfying the Scheimpflug condition.

Figure 2:
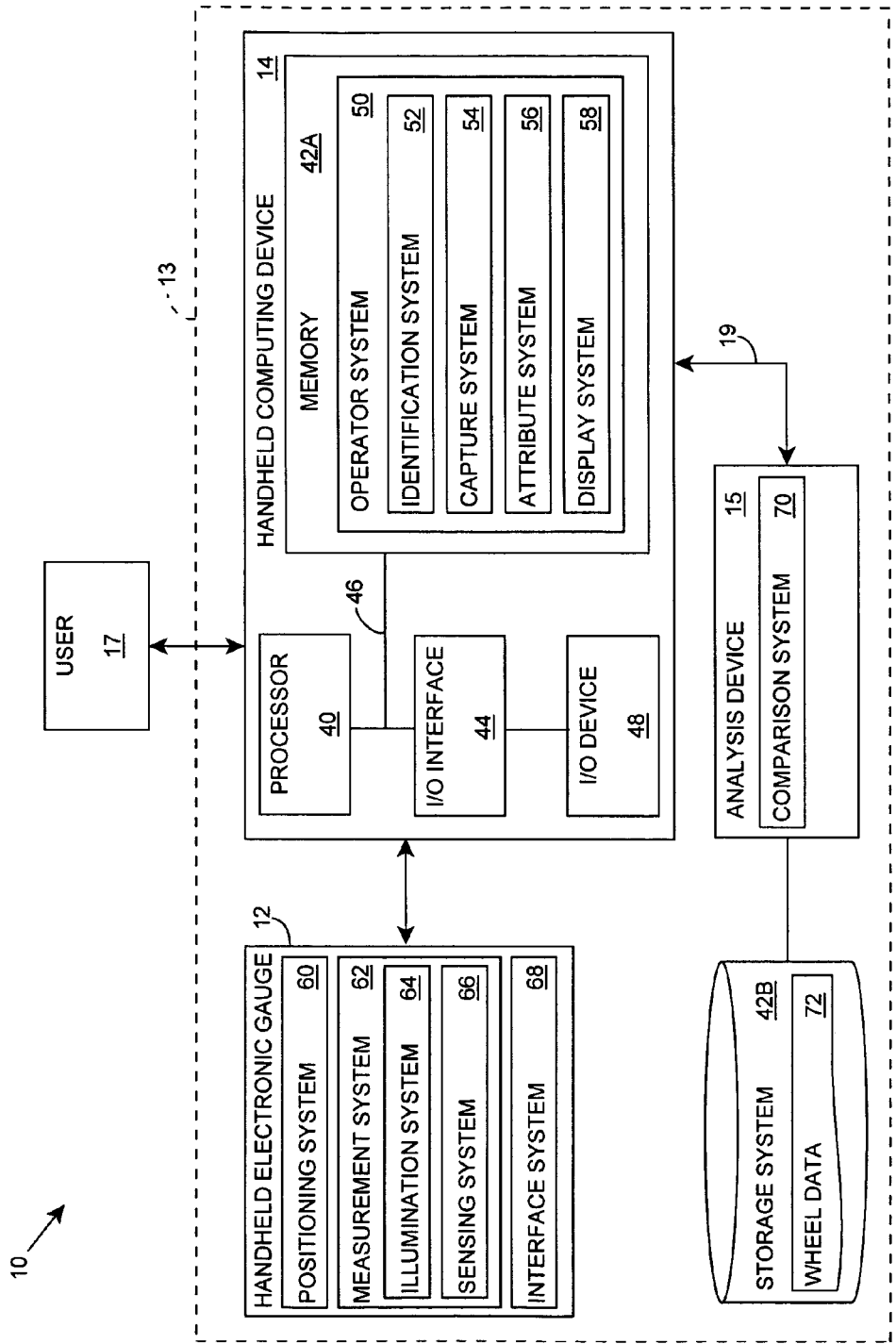
FIG. 2 shows a block diagram of the environment of FIG. 1.
Figure 10:
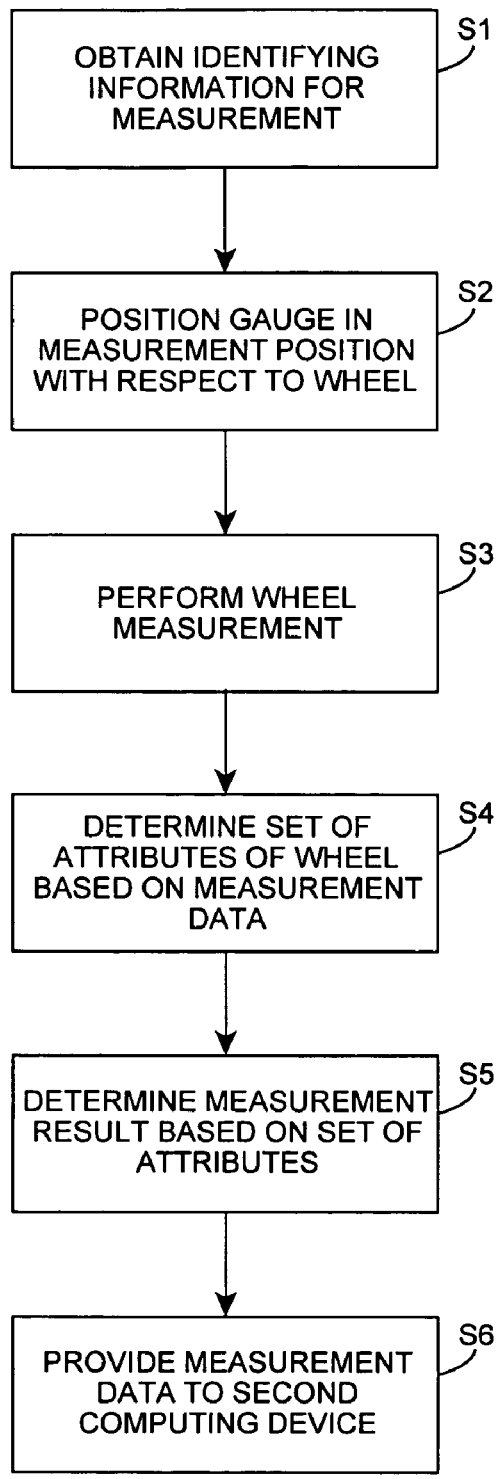
FIG. 10 shows illustrative method steps for measuring a wheel.

FIG. 10 shows illustrative method steps for measuring a wheel, which are discussed in conjunction with FIGS. 1 and 2. In step S1 of FIG. 10, user 17 can use identification system 52 to obtain identifying information for a measurement of wheel 11. For example, user 17 can provide identifying information for wheel 11, such as a serial number, a train/car and corresponding location on which wheel 11 is installed, or the like, that uniquely identifies wheel 11 to identification system 52, via keypad 28 and/or speaker 30. Similarly, identifying information could comprise an identification of a batch of wheels to which wheel 11 belongs (e.g., all wheels manufactured at a particular location, all wheels on a particular car, etc.). Further, identification system 52 can obtain identifying information for the measurement such as a date/time stamp, geographic location, etc. Still further, identification system 52 can obtain one or more attributes of the measurement, such as a scaled value corresponding to a number of data points to be collected. This information can be entered by user 17 and/or obtained from computing device 14 using any known manner.

In step S2, gauge 12 is positioned adjacent to wheel 11 in a measurement position with respect to wheel 11. The measurement position comprises a position of gauge 12 in which the various sensing and/or illuminating devices in measurement system 62 are correctly aligned for obtaining an accurate measurement of wheel 11. In general, user 17 can move gauge 12 into the measurement position. However, gauge 12 could be located in a fixed position, and wheel 11 could be moved along a track, or the like, until gauge 12 is in the measurement position.

Gauge 12 includes a positioning system 60 that assists in determining when gauge 12 is in the measurement position. For example, positioning system 60 can comprise the set of positioning sensors 96A-B (FIG. 4) discussed above that each provide a measurement position status for gauge 12. In particular, each sensor 96A-B could provide one measurement position status (e.g., FALSE) when gauge 12 is not properly aligned with wheel 11, and another measurement position status (e.g., TRUE) when gauge 12 is appropriately aligned with wheel 11. In one embodiment, a plurality of positioning sensors 96A-B are aligned along a horizontal and/or vertical axis of gauge 12 to ensure proper horizontal and/or vertical alignment of gauge 12 with respect to wheel 11. It is understood that positioning system 60 and/or measurement system 62 can communicate with one or more of the various components of operator system 50 using an interface system 68. To this extent, interface system 68 can comprise circuit board 98 (FIG. 5) as discussed above.

In any event, capture system 54 can obtain the measurement position status(es) from positioning system 60 and automatically determine when gauge 12 is in the measurement position. To this extent, capture system 54 can obtain the measurement position status of each sensor 96A-B (FIG. 4) and automatically determine that gauge 12 is in the measurement position based on the measurement position status(es). For example, in one embodiment, capture system 54 can determine that gauge 12 is in the measurement position when each sensor 96A-B is concurrently indicating that gauge 12 is appropriately aligned with wheel 11. It is understood, however, that based on different configurations of sensors 96A-B, various algorithms could be used to determine when gauge 12 is in the measurement position.

Once gauge 12 is in the measurement position, in step S3, the measurement can be performed. In one embodiment, capture system 54 can automatically initiate the measurement when gauge 12 is in the measurement position. Additionally, capture system 54 and/or interface system 68 could generate an audible and/or visible signal for user 17 that gauge 12 is in the measurement position. In this case, user 17 could initiate the measurement. In any event, capture system 54 can signal measurement system 62, via interface system 68, to measure wheel 11. In response, measurement system 62 can acquire data on wheel 11.

In one embodiment, measurement system 62 includes an illumination system 64 and a sensing system 66. In this case, capture system 54 can operate both illumination system 64 and sensing system 66. For example, capture system 54 can signal illumination system 64 to illuminate a plurality of points on wheel 11, and capture system 54 can signal sensing system 66 to sense a reflection of wheel 11 for each of the plurality of points. To this extent, as discussed above, illumination system 64 can comprise a plurality of light generating devices 90A-E (FIGS. 5-6), such as laser line generators, and sensing system 66 can comprise a corresponding set of light sensing devices 92A-E that are configured to sense reflections of the light (e.g., laser lines). When wheel 11 comprises a railway wheel, light generating devices 90A-E can illuminate and light sensing devices 92A-E can sense reflections of one or more points on a flange, a flange side, a field side, and/or a wheel tread surface of wheel 11 as shown and discussed above.

In any event, a number of data points obtained by measurement system 62 can be based on a scale selected by user 17 as discussed above. Subsequently, measurement system 62 can provide, via interface system 68, the acquired data for wheel 11, such as the data for each of the plurality of points on wheel 11, to capture system 54 for processing. Capture system 54 can store the plurality of points in a non-volatile memory 42A on computing device 14 to prevent the loss of the data should computing device 14 lose power. Additionally, interface system 68 on gauge 12 can comprise a non-volatile memory for temporarily storing the acquired data. In this case, measurement system 62 can store the data in the non-volatile memory on gauge 12, and interface system 68 can subsequently provide the data to capture system 54.

Regardless, capture system 54 can associate the measurement data, such as the plurality of points, with the identifying data for the measurement. To this extent, the identifying data and measurement data can be stored in memory 42A as a single data item (e.g., record, file, or the like). Once the measurement has been performed, capture system 54 and/or interface system 68 can provide a notification to user 17 of the completion of the measuring step. For example, capture system 54 and/or interface system 68 could generate an audible and/or visible signal. In response, user 17 can relocate wheel 11 and/or gauge 12 as desired. Further, capture system 54 can provide the identifying data and measurement data to attribute system 56 for further processing.

In step S4, attribute system 56 can determine a set (one or more) of attributes of wheel 11 based on the measurement data. For example, as discussed above, using the plurality of points, attribute system 56 can determine a profile 112 (FIG. 3) of wheel 11. Further, based on the determined profile 112 and/or plurality of points, attribute system 56 can determine one or more of a flange thickness, a flange height, a flange angle, a rim thickness, and a diameter of wheel 11 as discussed above. Subsequently, attribute system 56 can associate the determined attribute(s) with the identifying data and measurement data.

Further, in step S5, attribute system 56 can determine a measurement result based on the set of attributes. For example, in the case of a railway wheel 11, the measurement result can comprise an operation status of wheel 11, e.g., safe for operation, truing required, and/or unsafe/unacceptable. In this case, attribute system 56 can compare the attribute(s) with one or more corresponding standards for operating the wheel 11, such as those set by the AAR. Alternatively, the measurement result could comprise a determination as to whether wheel 11 is within certain manufacturing tolerances. For example, a railway wheel manufacturer may desire newly manufactured and/or trued wheels to comprise substantially uniform attributes that are within a certain tolerance. Should one or more of the measured attributes fall outside the tolerance, wheel 11 can be rejected for being sold and/or placed in service.

In any event, attribute system 56 can provide the measurement result to display system 58 for displaying to user 17. Subsequently, user 17 can take the appropriate action with respect to wheel 11. For example, user 17 could flag wheel 11 as being unsafe and/or requiring truing, can allow wheel 11 to continue to be used and/or sold, or the like. In addition to displaying measurement results, display system 58 can display the measurement data and/or one or more attributes for wheel 11, such as an attribute that caused wheel 11 to be considered unsafe, and user 17 could perform a manual inspection of wheel 11 to confirm the measured attribute.

In step S6, operator system 50 can provide the wheel data 72 to an analysis device 15. Wheel data 72 can comprise the measurement data (e.g., plurality of points), the set of attribute(s), the measurement result, and/or the identifying information. In one embodiment, computing device 14 can provide wheel data 72 to analysis device 15 via communications port 18. To this extent, communications port 18 could comprise a communication device for establishing a one-to-one connection with analysis device 15 (e.g., a universal serial bus (USB) port) and/or a communication device for connecting computing device 14 to a network on which analysis device 15 is also connected. In one embodiment, computing device 14 stores wheel data 72 for a plurality of wheels 11 in memory 42A. Subsequently, upon request from user 17 and/or analysis device 15, when memory 42A cannot store data for any additional wheels 11, and/or once user 17 has measured a related group of wheels 11 (e.g., all wheels in a batch, on a train, or the like), operator system 50 can provide wheel data 72 for use on analysis device 15. Once provided, operator system 50 can delete wheel data 72 from memory 42A.

In any event, analysis device 15 can store wheel data 72 on a storage system 42B. Further, analysis device 15 can include a comparison system 70 for performing comparisons on various measurements and/or attributes stored in wheel data 72. For example, comparison system 70 could obtain wheel data 72 previously obtained for a particular wheel 11 from wheel data 72, and compare the newly obtained wheel data 72 to it. In this case, user 17 could analyze the wear of wheel 11 over a series of measurements. Similarly, comparison system 70 can compare wheel data 72 for several related wheels 11, such as wheels 11 from the same manufacturer, manufactured in a similar batch, located on the same car, etc. In this case, comparison system 70 may be able to determine a systematic change in one or more attributes for all of the wheels 11 in the group, which could indicate the presence of a common condition for the group of wheels 11. In either case, comparison system 70 could determine a deviation that is out of the ordinary. Subsequently, comparison system 70 could prompt user 17 to re-measure wheel 11 before proceeding to measure another wheel.

Figure 11:
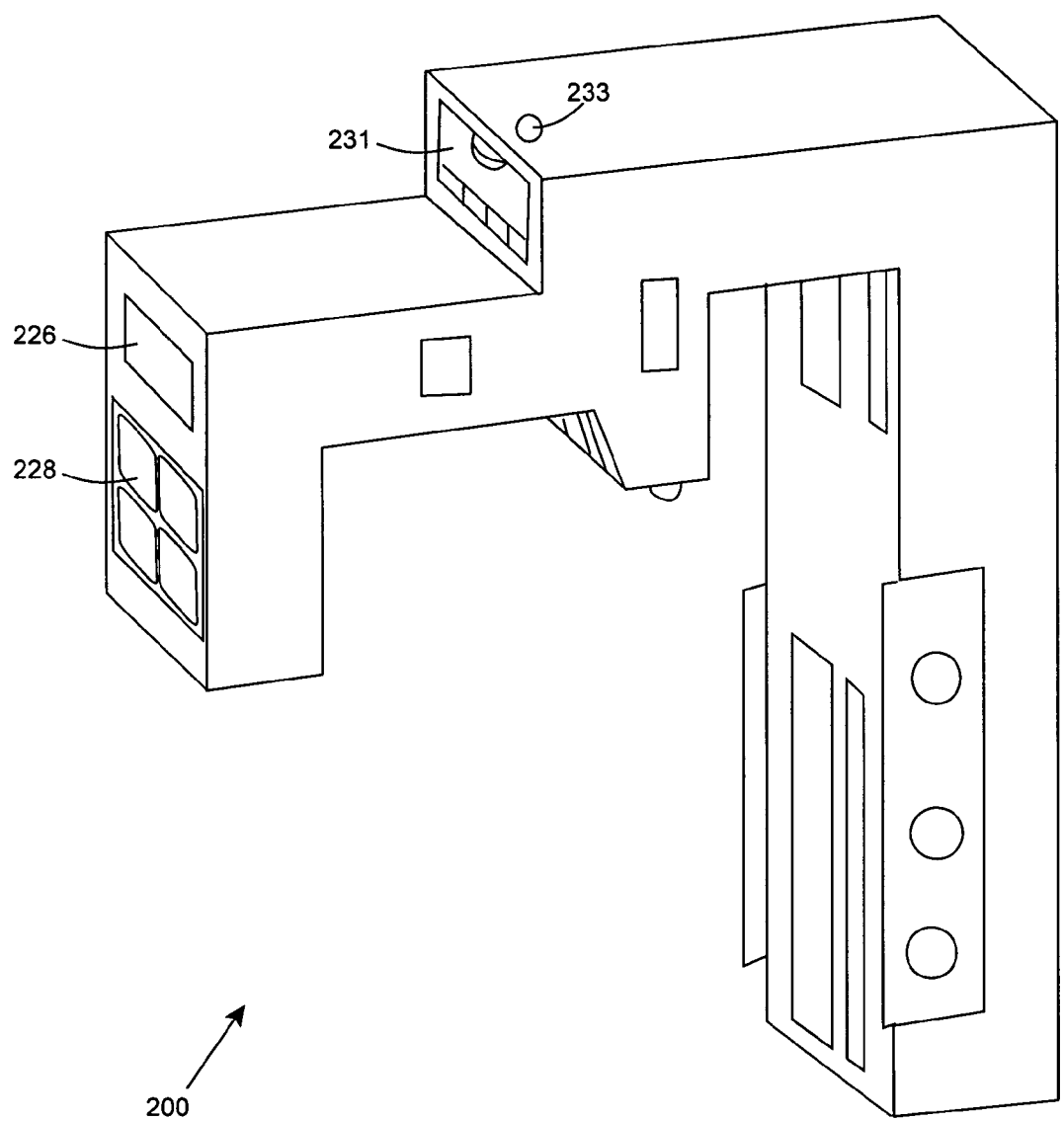
FIG. 11 shows an alternative gauge according to another embodiment of the invention.

While computer infrastructure 13 has been shown and described as including a separate gauge 12, handheld computing device 14, and analysis device 15, it is understood that some or all of the various systems could be implemented on a single computing device. For example, comparison system 70 could be implemented on handheld computing device 14. Further, FIG. 11 shows an alternative gauge 200 according to another embodiment of the invention. In this case, gauge 200 includes comparable components as those described above with respect to handheld electronic gauge 12 (FIGS. 1 and 2) and handheld computing device 14 (FIGS. 1 and 2) within a single housing. To this extent, gauge 200 is shown including a display 226 and a keypad 228. Further, gauge 200 can include a door 231 for obtaining access to a power source, such as a battery and/or receptacle 20 (FIG. 1), and a button 233 that can be operated to open door 231.

Figure 12:
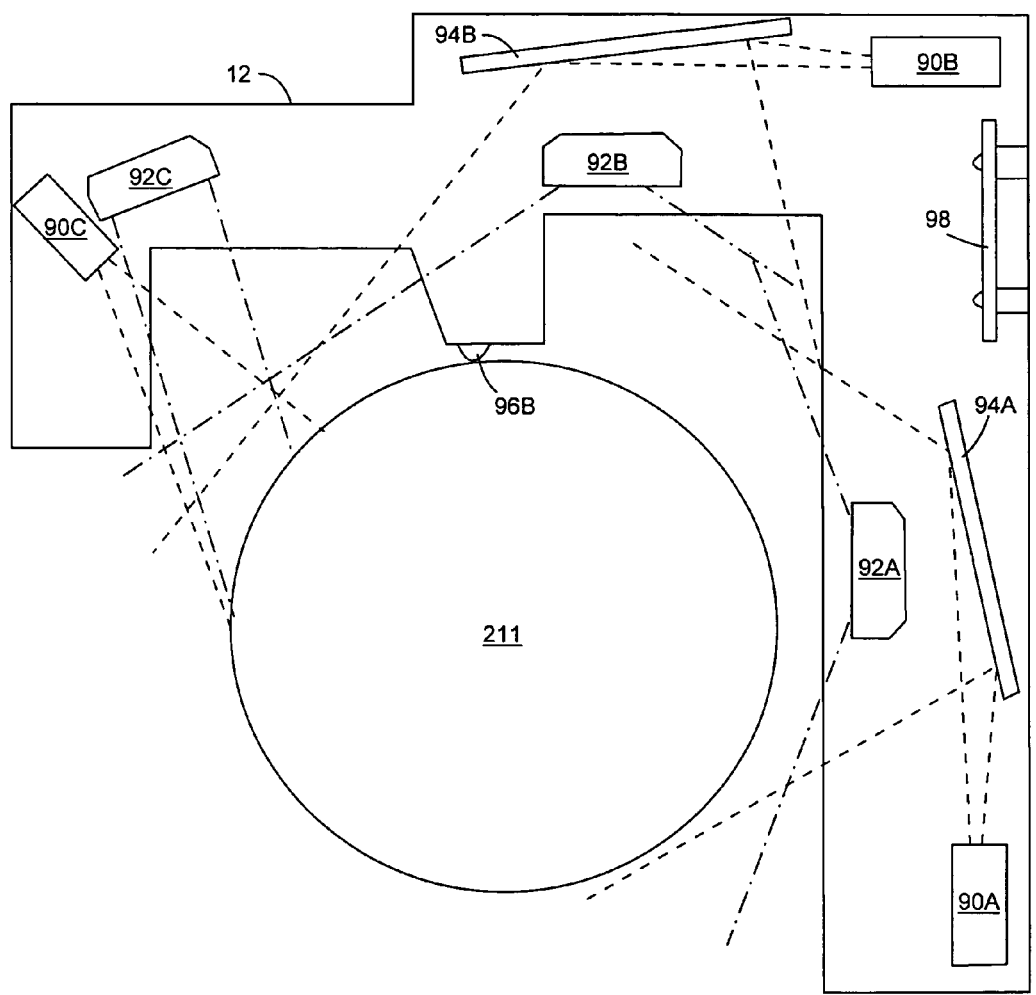
FIG. 12 shows an illustrative gauge configured to obtain a set of measurements for an axle.
Figure 13:
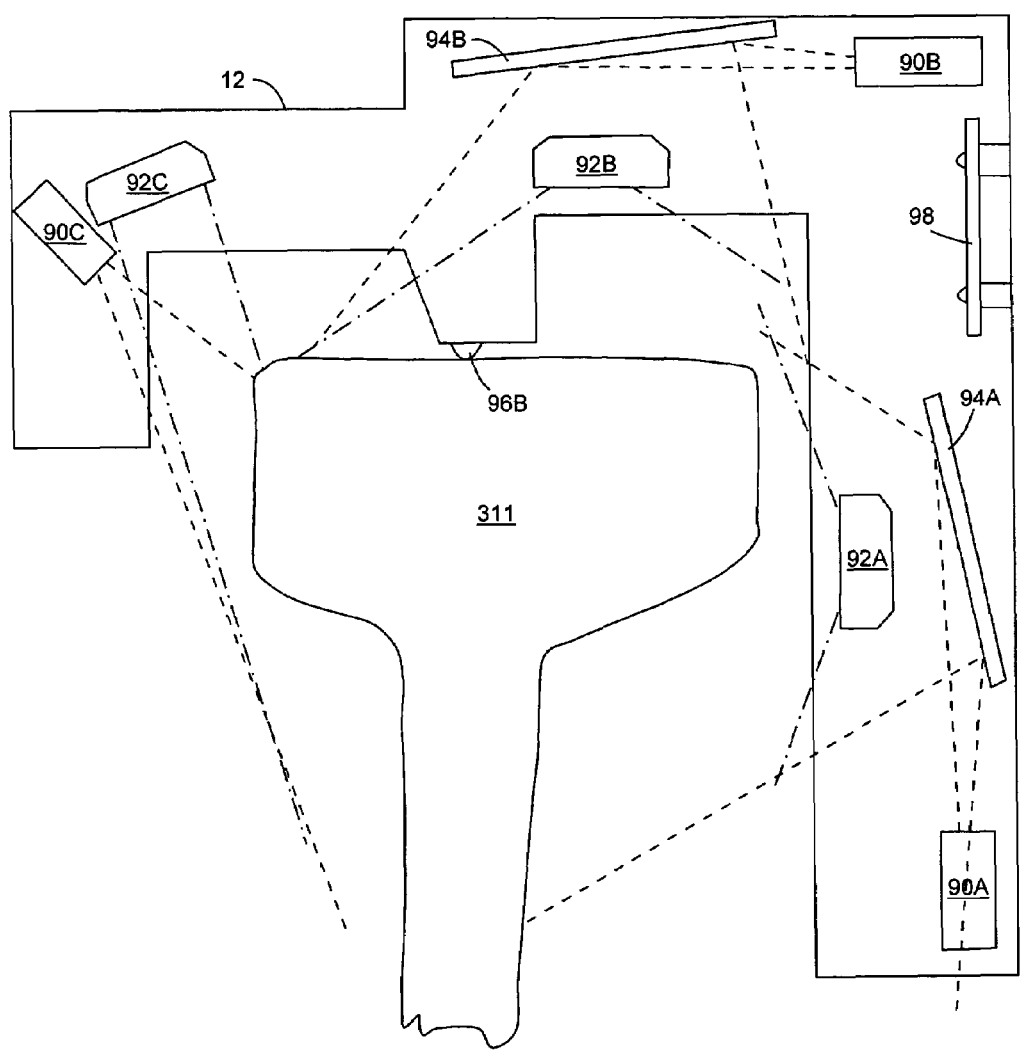
FIG. 13 shows an illustrative gauge configured to obtain a set of measurements for a rail.

Additionally, gauge 12 (FIGS. 1 and 2) can be used in various measurement applications. For example, FIG. 12 shows an illustrative gauge 12 configured to obtain a set of measurements for an axle 211 and FIG. 13 shows an illustrative gauge 12 configured to obtain a set of measurements for a rail 311. In either case, gauge 12 can be placed in a measurement position outside axle 211/rail 311 using positioning system 60 (FIG. 2). Subsequently, gauge 12 can obtain a plurality of data points using measurement system 62 (FIG. 2). For axle 211, the data points can be used to recreate a profile of axle 211, and/or measure one or more attributes of axle 211 such as an outside diameter, a roundness, a surface quality, and/or the like. For rail 311, the data points can be used to recreate a profile of rail 311, and/or measure one or more attributes of rail 311 such as an outside dimension, a surface quality, and/or the like. Gauge 12 can be used in various other applications. For example, gauge 12 could be used to measure various attributes of a round opening of an object (e.g., a wheel hub), such as an inside diameter, roundness, and/or surface quality. In this case, gauge 12 can be placed inside the round opening and can acquire data points that can be used to calculate the desired measurements.

In one embodiment, the same gauge 12 is used to measure wheel 11 (FIG. 1), axle 211, and rail 311. In this case, positioning system 60 (FIG. 2) and/or measurement system 62 (FIG. 2) may comprise various components (e.g., sensors, illumination devices) that are used in a subset of all possible objects for which gauge 12 can be used. To this extent, identification system 52 (FIG. 2) can further obtain a type of object being measured, and operation of the various other systems in operator system 50 (FIG. 2) can be altered accordingly. Alternatively, a different gauge 12 can be used to measure various objects. In this case, identification system 52 could automatically determine the object being measured based on gauge 12, and operation of the various other systems in operator system 50 could be automatically altered accordingly.

It is understood that various enhancements, modifications and/or substitutions can be made to the embodiments described herein. For example, illumination system 64 (FIG. 2) and sensing system 66 (FIG. 2) could comprise different equivalent illumination/sensing devices that incorporate another type of optics. Further, an equivalent illumination/sensing solution that incorporates another form of electromagnetic radiation, such as ultrasonic energy, microwave energy, or the like could be used in place of the laser-based imaging described herein. Still further, an equivalent non-optical illumination/sensing solution, such as a magnetic field line-based solution, an eddy current-based solution, a hall effect-based solution, a MEMS-based solution, or the like, could be used in place of the laser-based imaging described herein.

In any event, under the invention, measurements are electronically taken and recorded, thereby improving and assuring measurement accuracy. Additionally, the use of electronic sensors for determining a position of the measurement devices with respect to the object helps ensure accurate measurements. Further, the measurement data can be communicated directly to a computerized maintenance management system for storage and/or further processing. As a result, when used in the measurement of wheels, the invention provides for safer, smoother wheels, reduces the time and paperwork required to measure a wheel, provides a numeric control interface for a wheel truing machine, reduces lost time and/or resources due to the misclassification of wheels, and enables more accurate forecasting of new wheel purchases. Similar advantages are provided for other measurement applications as will be apparent to one in the art.

While shown and described herein as a method and system for measuring an object, it is understood that the invention further provides various alternative embodiments. For example, in one embodiment, the invention provides a computer-readable medium that includes computer program code to enable a computer infrastructure to measure an object. To this extent, the computer-readable medium includes program code, such as operator system 50 (FIG. 2), that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 42A (FIG. 2) and/or storage system 42B (FIG. 2) (e.g., a fixed disk, a read-only memory, a random access memory, a cache memory, etc.), and/or as a data signal traveling over a network (e.g., during a wired/wireless electronic distribution of the program code).

In still another embodiment, the invention provides a method of generating an environment for measuring an object. In this case, a computer infrastructure, such as computer infrastructure 13 (FIG. 2), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 14 (FIG. 2), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of measuring an object, the method comprising:
    positioning a handheld electronic gauge adjacent to a side of the object; and
    obtaining measurement data for the object using the gauge, wherein the obtaining step includes:
        illuminating at least a portion of the side of the object, wherein the illuminating includes illuminating the side of the object below the gauge and in two locations that are transverse to and on opposite sides of the gauge with a set of illumination devices disposed in the gauge;
        sensing a reflection of the illuminated object from the illuminated side, wherein the sensing includes sensing a reflection from below the gauge and the two locations with a set of sensing devices disposed in the gauge; and
        measuring a plurality of data points on the illuminated side of the object based on the sensed reflections.

2. The method of claim 1, further comprising determining a profile of the object based on the measurement data.

3. The method of claim 1, further comprising providing the measurement data for use on a second computing device.

4. The method of claim 1, further comprising automatically determining that the gauge is in a measurement position, wherein the automatically determining step includes determining a measurement position status for at least one positioning sensor.

5. The method of claim 4, further comprising automatically initiating the measuring step based on the determining step.

6. The method of claim 1, further comprising providing a notification of completion of the measuring step.

7. The method of claim 1, further comprising obtaining identifying information for the measurement, wherein the measurement data is associated with the identifying information.

8. The method of claim 1, further comprising:
obtaining previous measurement data for the object;
comparing the measurement data to the previous measurement data;
determining that the measurement data abnormally deviates from the previous measurement data; and
prompting a user of the gauge to re-measure the object.

9. A system for measuring an object, the system comprising:
a handheld electronic gauge that includes:
means for automatically determining that the gauge is in a measurement position with respect to the object; and
means for obtaining measurement data for the object, wherein the means for obtaining includes:
means for illuminating at least a portion of a side of the object;
means for sensing a reflection of the illuminated object for each of a plurality of points on the object from the illuminated side; and
means for measuring a plurality of data points on the illuminated side of the object based on the sensed reflection; and
a computing device in communication with the gauge, wherein the computing device is configured to compare the measurement data to previous measurement data for the object, determine that the measurement data abnormally deviates from the previous measurement data based on the comparison, and prompt a user of the gauge to re-measure the object in response to the determination.

10. The system of claim 9, further comprising means for determining a profile of the object based on the measurement data.

11. The system of claim 9, further comprising a non-volatile memory for storing the measurement data.

12. The system of claim 9, wherein the gauge further includes:
means for processing the measurement data; and
means for interfacing with a user.

13. The system of claim 9, wherein the means for automatically determining includes means for determining a measurement position status for at least one positioning sensor.

14. The system of claim 9, further comprising means for providing a notification of completion of a measurement.

15. The system of claim 9, further comprising means for obtaining identifying information for the measurement.

16. A system for measuring an object, the system comprising:
a handheld electronic gauge that includes:
a light generating device configured to generate light;
a mirror configured to direct the light onto at least a portion of a top surface of the object when the gauge is held in an upright position;
a sensing device configured to obtain measurement data for the object by sensing a reflection of the light from the top surface; and
a computing device that includes:
means for obtaining a scale for the measuring;
means for automatically determining that the gauge is in the measurement position; and
means for automatically obtaining measurement data for the object when the gauge is in the measurement position, wherein the means for automatically obtaining includes:
means for operating the light generating device;
means for operating the sensing device;
means for measuring a plurality of data points on the top surface of the object based on the sensed reflection; and
means for adjusting at least one of: operation of the light generating device, operation of the sensing device, or a number of data points in the plurality of data points according to the scale.

17. The system of claim 16, further comprising an analysis system for analyzing the measurement data with previous measurement data.

18. The system of claim 9, wherein the object is a wheel, the means for illuminating including means for illuminating a top surface of the wheel in two locations that are on opposite sides of the gauge and the means for sensing including means for sensing reflections from the two locations, the system further comprising means for determining a circumference of the wheel based on the measurement data.

19. The system of claim 9, wherein the means for illuminating and means for sensing are configured to satisfy the Scheimpflug condition when the gauge is in the measurement position.

20. The system of claim 16, the computing device further including:
means for comparing the measurement data to previous measurement data for the object;
means for determining that the measurement data abnormally deviates from the previous measurement data; and
means for prompting a user of the gauge to re-measure the object.

21. The method of claim 1, further comprising obtaining a scale for the measuring, wherein the obtaining measurement data includes adjusting at least one of: the illuminating, the sensing, or the measuring based on the scale.

22. The method of claim 1, wherein the illuminating includes illuminating at least a portion of a second side and a third side of the object, and wherein the sensing includes sensing reflections of the illuminated object from the second side and the third side.

23. The system of claim 16, wherein the sensing device, mirror and light generating device are configured to satisfy the Scheimpflug condition when the gauge is in a measurement position with respect to the object.

* * * * *